(12) United States Patent
Lipton et al.

(10) Patent No.: US 10,545,501 B1
(45) Date of Patent: Jan. 28, 2020

(54) AUTONOMOUS AERIAL VEHICLE FOR LIGHTING INSPECTION AND REPLACEMENT AND METHODS FOR USE THEREWITH

(71) Applicants: Marc Lipton, Ann Arbor, MI (US); Bruce E. Stuckman, Austin, TX (US)

(72) Inventors: Marc Lipton, Ann Arbor, MI (US); Bruce E. Stuckman, Austin, TX (US)

(*) Notice: Subject to any disclaimer, the term of this patent is extended or adjusted under 35 U.S.C. 154(b) by 0 days.

(21) Appl. No.: 16/027,843

(22) Filed: Jul. 5, 2018

(51) Int. Cl.
*G05D 1/00* (2006.01)
*G05D 1/10* (2006.01)
*H01J 9/00* (2006.01)

(52) U.S. Cl.
CPC ........... *G05D 1/0088* (2013.01); *G05D 1/101* (2013.01); *H01J 9/003* (2013.01); *B64C 2201/127* (2013.01); *B64C 2201/145* (2013.01)

(58) Field of Classification Search
CPC ....... G05D 1/0088; G05D 1/101; H01J 9/003; B64C 2201/145; B64C 2201/127
See application file for complete search history.

(56) References Cited

U.S. PATENT DOCUMENTS 9,815,197 B1* 11/2017 Pickover ............... B25J 9/1661
2018/0068185 A1* 3/2018 Schultz ................. B64D 47/08

* cited by examiner

*Primary Examiner* — Anne M Antonucci
(74) *Attorney, Agent, or Firm* — Garlick & Markison; Bruce E. Stuckman

(57) ABSTRACT

An autonomous aerial vehicle (AAV) includes a plurality of lightbulb changers and an actuator for controlling the plurality of lightbulb changers. A structure database stores structure data corresponding to a structure, the structure data including coordinate data corresponding to three-dimensional coordinates of a location that facilitates an unobstructed view of a plurality of exterior lights of the structure, the structure data further including schematic data that indicates positions on the structure of the plurality of exterior lights. A flight control system controls a position of the AAV, based on the coordinate data, to the location that facilitates the unobstructed view of the plurality of exterior lights of the structure. A camera captures image data corresponding to the unobstructed view of the plurality of exterior lights of the structure. A processor controls the AAV to perform a lighting inspection procedure and/or a lightbulb replacement process.

20 Claims, 12 Drawing Sheets

100

118

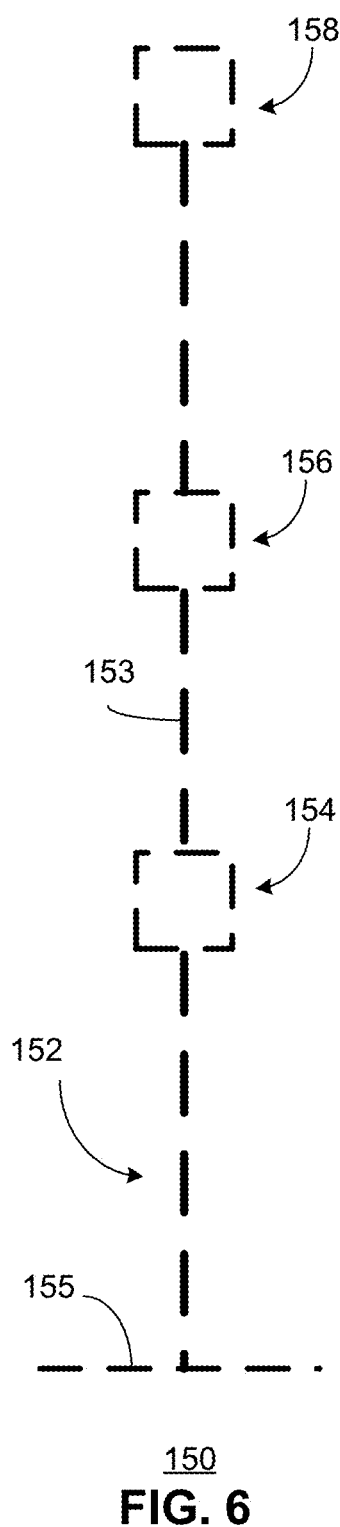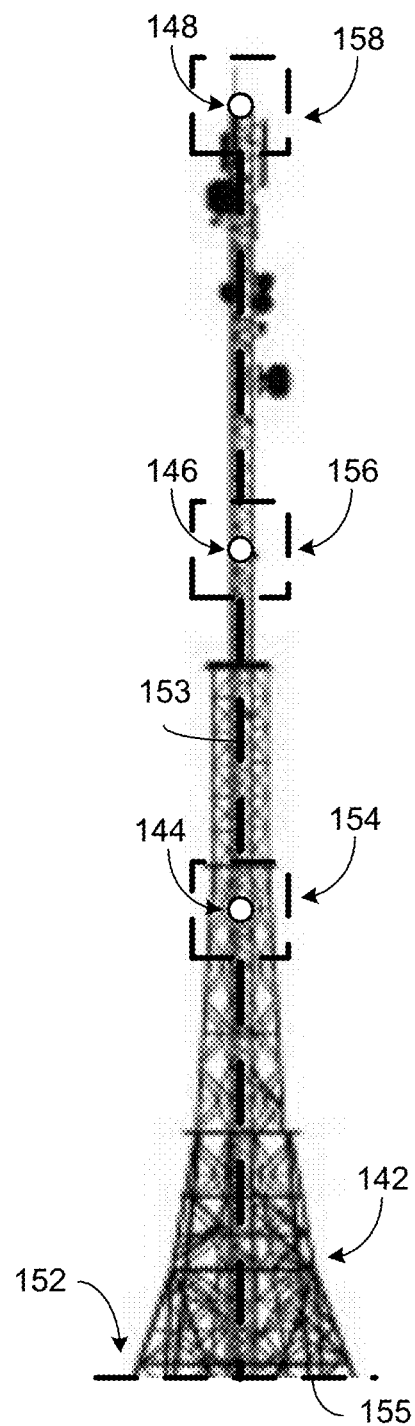
FIG. 6
FIG. 7

AUTONOMOUS AERIAL VEHICLE FOR LIGHTING INSPECTION AND REPLACEMENT AND METHODS FOR USE THEREWITH

BACKGROUND OF THE INVENTION

This disclosure relates generally to autonomous aerial vehicles such as multi-copters or other unmanned aircraft.

BRIEF SUMMARY OF THE INVENTION

The present disclosure is directed to apparatus and methods of operation that are further described in the following Brief Description of the Drawings, the Detailed Description, and the claims. Other features and advantages of the present disclosure will become apparent from the following detailed description made with reference to the accompanying drawings.

BRIEF DESCRIPTION OF THE SEVERAL VIEWS OF THE DRAWING(S)

FIG. 6 is a graphical diagram of schematic data 152 in accordance with an embodiment of the present disclosure.

FIG. 7 is a graphical representation of schematic data 152 superimposed on image data of a structure 142 in accordance with an embodiment of the present disclosure.

DETAILED DESCRIPTION

Figure 1:
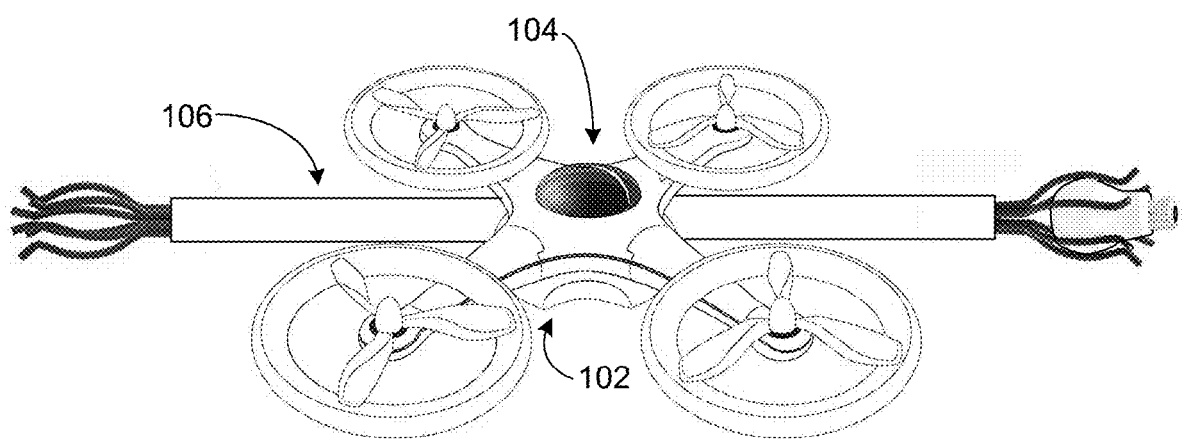
FIG. 1 is a pictorial diagram representation of an autonomous aerial vehicle 100 in accordance with an embodiment of the present disclosure.

FIG. 1 is a pictorial diagram representation of an autonomous aerial vehicle (AAV) 100 in accordance with an embodiment of the present disclosure. In particular, the AAV 100 includes an aircraft body 102 having a flight control system that controls the position of the AAV 100, a camera 104 and a lightbulb changing mechanism 106 that includes a plurality of lightbulb changers that are controlled via an actuator.

In operation, a structure database stores structure data corresponding to a structure such as a building, a tower, a bridge, or other fixed architectural or physical structure having one or more exterior lights, such as aviation obstruction lights or other lighting. The structure data includes coordinate data corresponding to three-dimensional coordinates of a location that facilitates an unobstructed view of the exterior lights of the structure. The structure data further includes schematic data that indicates positions on the structure of the exterior lights. A flight control system controls a position of the AAV 100, based on the coordinate data, to the location that facilitates the unobstructed view of the plurality of exterior lights of the structure. The camera 104 captures image data corresponding to the unobstructed view of exterior lights of the structure. A processor is configured to control the AAV 100 to perform a lighting inspection procedure and a lightbulb replacement process that utilizes the lightbulb changing mechanism 106.

While the aircraft body is shown as being configured as a quadcopter, other aircraft designs including single and multi-copter configurations, lighter than air aircraft and other designs are likewise possible. The implementation and operations of the AAV 100 are presented along with various optional features that will be described in greater detail in conjunction with FIGS. 2-9 that follow.

FIGS. 2A-2G are pictorial/block diagram representations that illustrate lightbulb changing mechanism 106 in accordance with an embodiment of the present disclosure. The lightbulb changing mechanism 106 is coupled to a portion of the underside of the aircraft body 102 as shown, however other support configurations are likewise possible. The lightbulb changing mechanism 106 includes lightbulb changers 115 and 115' having grippers 114 and 114' that are coupled via shafts 116 and 116', respectively, to the actuator 112. Gripper 114' is shown as gripping a replacement lightbulb 117. The actuator 112 is configured to control the lightbulb changers 115 and 115' via one or more stepper motors, other control motors or other actuators that operate controllably to turn the shafts 116 and 116' in order to screw and unscrew or otherwise install and uninstall a lightbulb from a light socket.

Figure 2A:
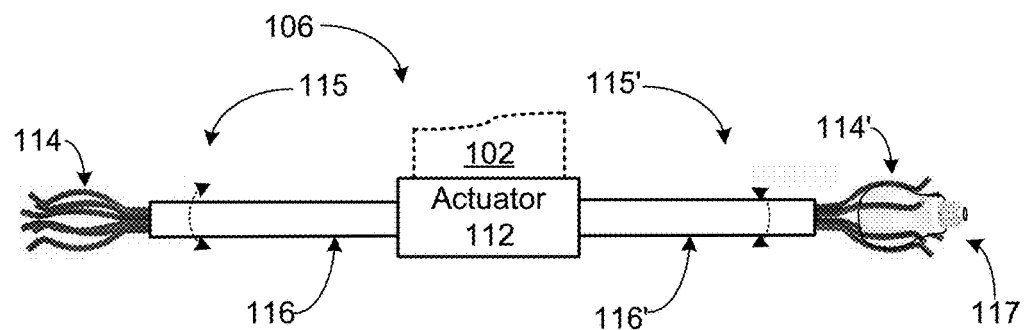
FIGS. 2A-2I are pictorial/block diagram representations that illustrate lightbulb changing mechanism 106 in accordance with an embodiment of the present disclosure.
Figure 2B:
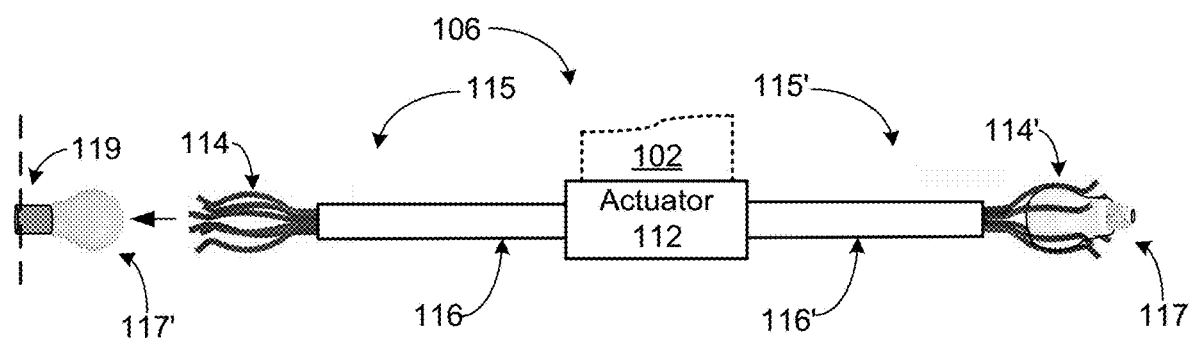
Figure 2C:
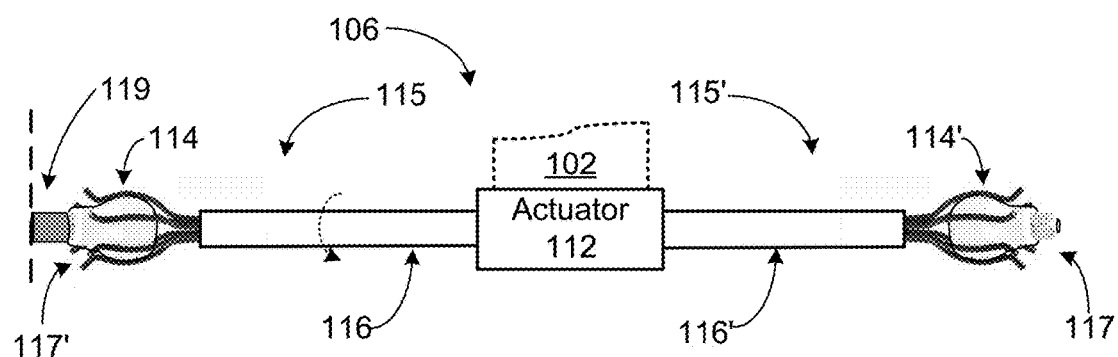
Figure 2D:
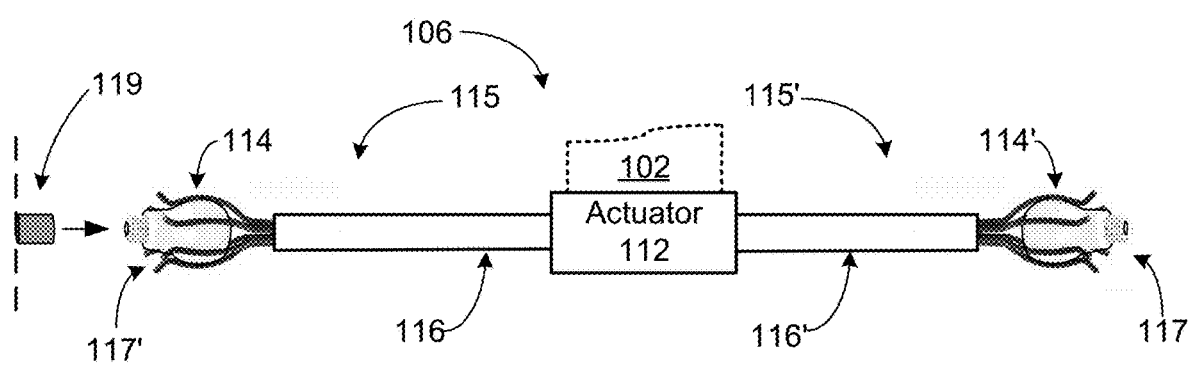

As discussed in conjunction with FIG. 1, the lightbulb changing mechanism 106 can be used by the AAV 100 to implement a lightbulb replacement process. For example, the position of the AAV 100 can be controlled to a location adjacent to a failed lightbulb 117' in a socket 119 of a structure as shown on FIG. 2B. The position and orientation of the AAV 100 is controlled to engage the lightbulb changer 115 with the failed lightbulb 117'. In particular, the AAV 100 can be moved so that the gripper 114 is inserted over the failed lightbulb so as to engage the failed lightbulb 117' as shown in FIG. 2C. The AAV 100 then remains in a stable hover state while the actuator 112 controls the lightbulb changer 115 to remove the failed lightbulb from the socket 119. In particular, the actuator 112 turns the shaft 116 counter-clockwise so as to unscrew the failed lightbulb 117'. The AAV 100 can then move away with the failed lightbulb 117' in the gripper 114 as shown in FIG. 2D.

Figure 2E:
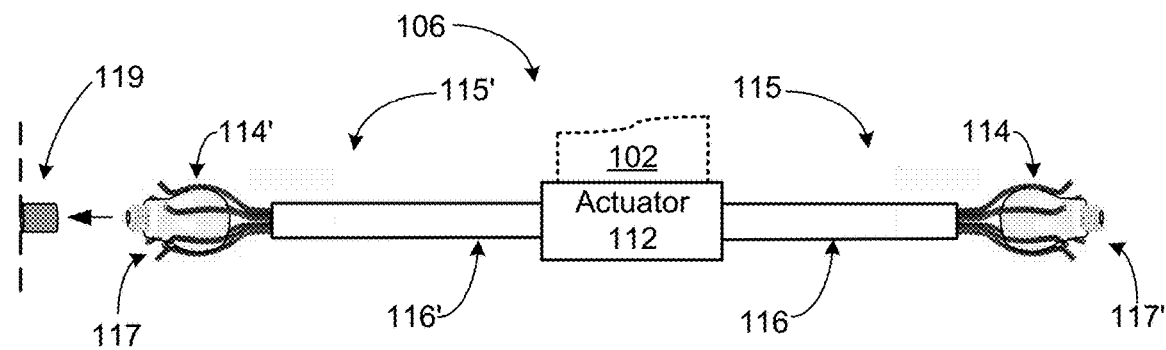
Figure 2F:
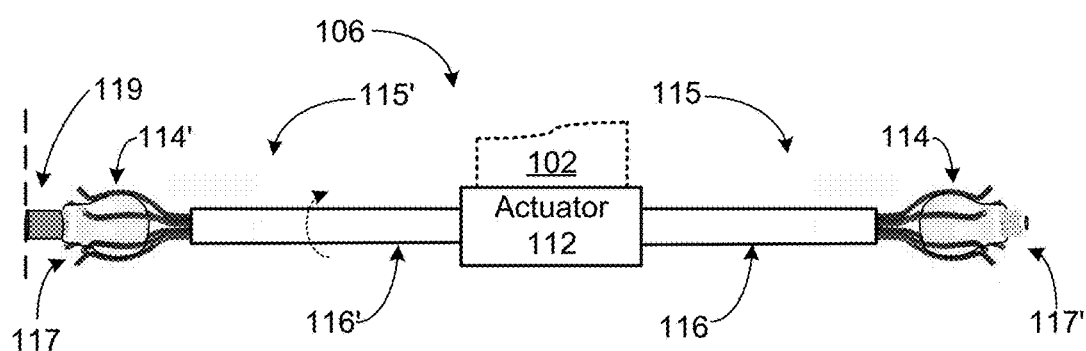
Figure 2G:
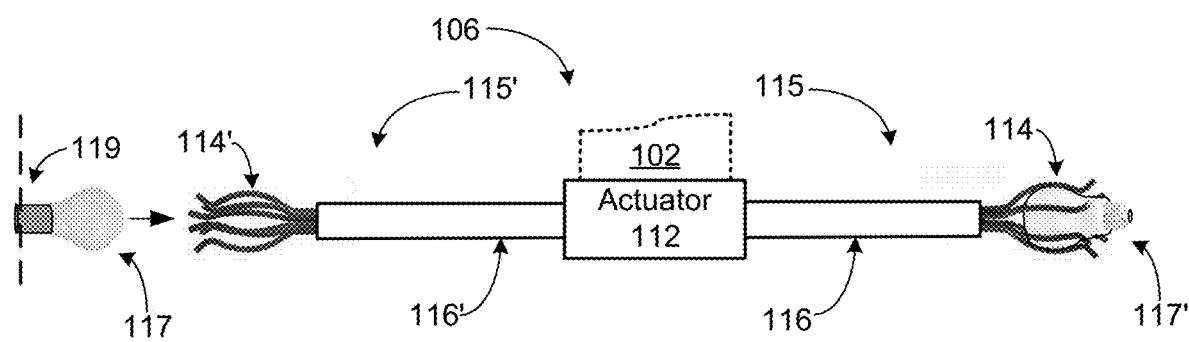

The AAV 100 can then be reoriented and repositioned to engage the replacement lightbulb 117 in gripper 114' with the socket 119 as shown in FIG. 2E. In particular, the AAV 100 can be moved so that the replacement lightbulb 117 in gripper 114' is inserted in the socket 119. The AAV 100 then remains in a stable hover state while the actuator 112 controls the lightbulb changer 115' to install the replacement lightbulb 117 in the socket 119. In particular, the actuator 112 turns the shaft 116' clockwise so as to screw the replacement lightbulb 117 in the socket 119 as shown in FIG. 2F. The AAV 100 can then complete the installation by moving away, releasing the grip of the gripper 114' as shown in FIG. 2G.

Figure 2H:
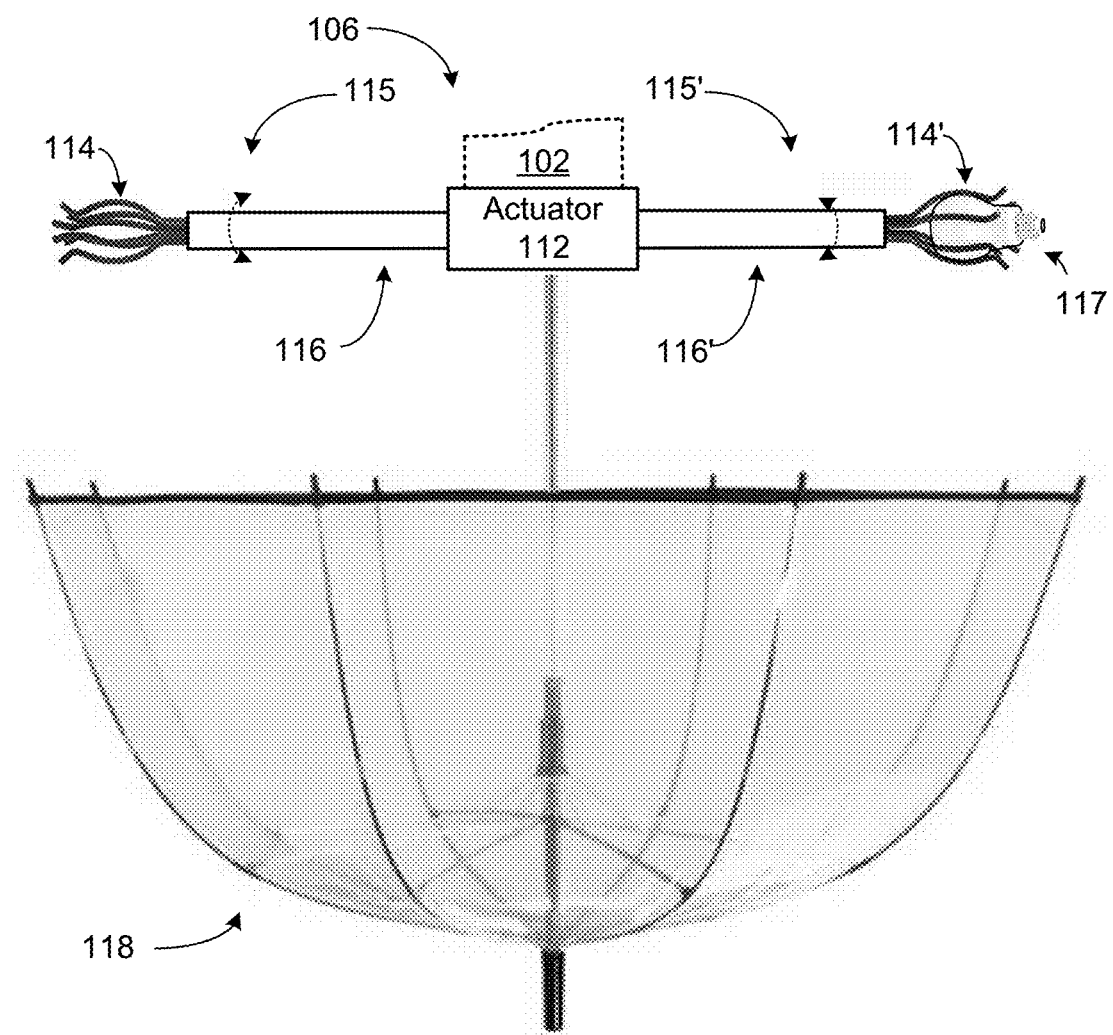

FIG. 2H further includes a canopy 118 that can be opened by the actuator 112 during the lightbulb replacement procedure in order to catch a bulb that may be inadvertently dropped to avoid a hazard to ground personnel, glass cleanup, etc. The canopy can be closed, in an umbrella-like fashion for example, before and after the lightbulb replacement process in order to facilitate more stable flight by the AAV 100.

Figure 2I:
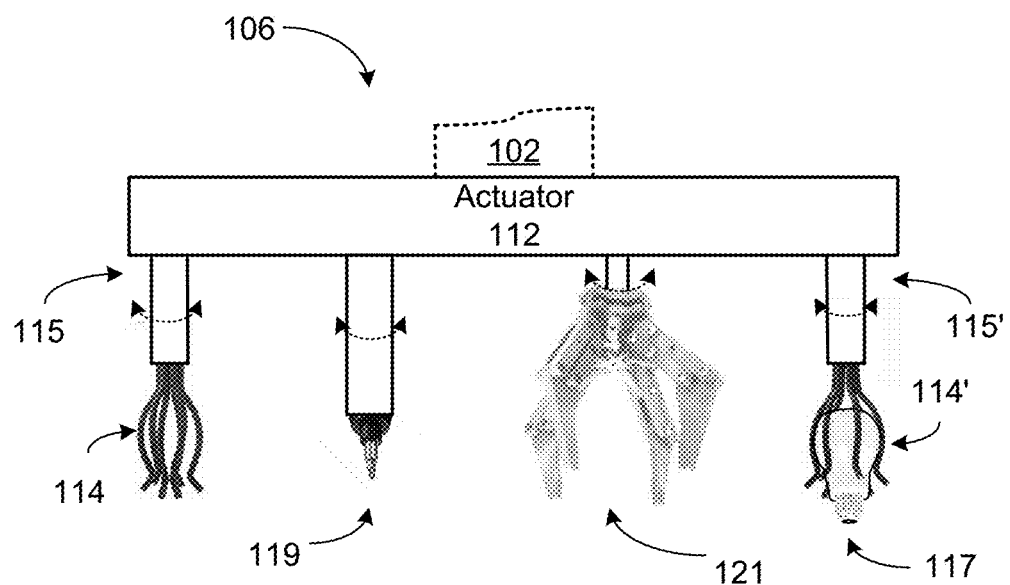
Figure 2I:
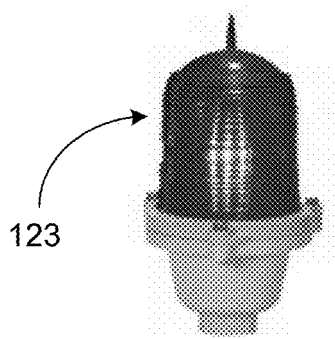

While the prior examples have illustrated horizontal configurations of the grippers 114 and 114', the grippers 114 and 114' can likewise be implemented in a vertical configuration as shown in FIG. 2I. Furthermore, the lightbulb changing mechanism 106 can further include a tool 119, such an electric screwdriver, nut driver or other tool and a housing gripper 121 that are configured to facilitate removal and reinstallation of a portion of the housing of an aviation obstruction light assembly 123 that covers the lightbulb to be replaced. While not expressly shown, the camera 104 can include a plurality of cameral elements including one or more camera elements configured to capture images of the lightbulb changer 115, lightbulb changer 115', tool 119, housing gripper 121, and aviation obstruction light assembly 123 during the lightbulb replacement process to aid in controlling the position and orientation of the AAV 100 and further to control the operation of the lightbulb changer 115, lightbulb changer 115', tool 119 and housing gripper 121 during the lightbulb replacement process.

Consider an example where the aviation obstruction light assembly 123 includes a cap that is secured by several screws that remain attached to the cap when unscrewed. The lightbulb replacement process can include unscrewing the screws that secure the cap via the tool 119, gripping and removing the cap via the housing gripper 121, removing the failed lightbulb via lightbulb changer 115, installing a new lightbulb via lightbulb changer 115', reseating the cap via housing gripper 121, and screwing in the screws that secure the cap via the tool 119.

Figure 3:
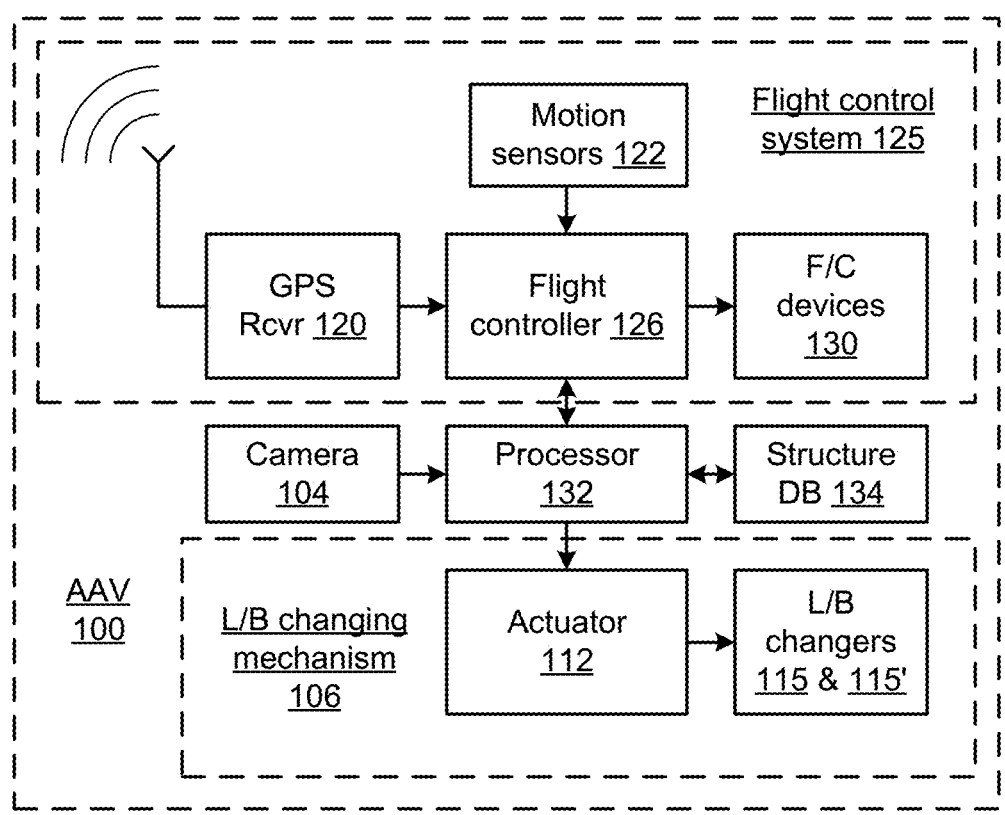
FIG. 3 is a block diagram representation of an autonomous aerial vehicle 100 in accordance with an embodiment of the present disclosure.

It should be noted that while a particular gripper and lightbulb configuration is shown, other grippers and/or other lightbulb configurations could likewise be implemented. Furthermore, while the lightbulb replacement procedure described above contemplates the use of lightbulbs with screw bases, the procedures above could easily be modified for bayonet style bulbs and sockets or other base/socket configurations as will be apparent to one skilled in the art. In addition, while the foregoing description has presented a configuration with two light bulb changers to replace a single bulb, N (greater than 2) lightbulb changers could be implemented in a similar fashion to install N−1 lightbulbs without returning to base. Furthermore, while FIG. 3 is a block diagram representation 118 of an autonomous aerial vehicle 100 in accordance with an embodiment of the present disclosure. The AAV 100 includes the lightbulb changing mechanism 106 having lightbulb changers 115 and 115' and an actuator 112. A structure database 134, such as a memory, is configured to store structure data corresponding to a structure. The structure data can include coordinate data corresponding to three-dimensional coordinates of a location that facilitates an unobstructed view of a plurality of exterior lights of the structure, and schematic data that indicates positions on the structure of the plurality of exterior lights.

The AAV further includes a flight control system 125, camera 104 and processor 132. The flight control system 125 is configured to control the position (x, y, z) and orientation (roll, pitch and yaw) of the AAV 100 in a flight plan, stable hover state and/or to otherwise control the motions of the AAV 110 as described herein.

The flight control system 125 includes a global positioning system (GPS) receiver 120 and motion sensors 122 that includes one or more axes of accelerometers or gyroscopes or other devices that alone, or with further processing by flight controller 126, can generate position and or orientation data that reflects the current orientation and position of the AAV 100 in three-dimensional space. The flight controller responds to commands from the processor 132 and generates command data to control the motion of the AAV 100 via flight control devices 130 such as rotors, actuators, control surfaces, gimbals or other controllers.

Processor 132 and flight controller 126 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processor 132 and/or flight controller 126 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an example of operation, the flight control system 125 controls the position and orientation of the AAV 100, based on the coordinate data, to a location that facilitates the unobstructed view of the plurality of exterior lights of the structure. The camera 104 is configured to capture image data corresponding to the unobstructed view of the plurality of exterior lights of the structure. The processor 132 is configured to perform a lighting inspection procedure that includes:

(a) superimposing the schematic data on the image data;
(b) identifying, based on the schematic data, regions in the image data corresponding to the positions on the structure of the plurality of exterior lights;
(c) analyzing the image data within the regions to determine if each of the plurality of exterior lights is operating properly; and
(d) generating fault data indicating whether or not one of the plurality of exterior lights is not operating properly.

Consider a further example where the structure has its own lighting alarm system that generates a wireless alarm signal that indicates one or more of the exterior lights have failed. This alarm signal can be received by a transceiver (not expressly shown) that is coupled to the processor 132, and used to tripper, by the processor 132, the initiation of the lighting inspection procedure that includes:

(a) superimposing the schematic data on the image data;
(b) identifying, based on the schematic data, regions in the image data corresponding to the positions on the structure of the plurality of exterior lights;
(c) analyzing the image data within the regions to determine which of the plurality of exterior lights is not operating properly; and
(d) generating fault data indicating which of the plurality of exterior lights is not operating properly.

If one of the plurality of exterior lights is not operating properly (e.g. has burned out or otherwise failed), the processor 132 implements a lightbulb replacement process that includes:

(a) commanding the flight control system 125 to control the position of the AAV 100 to a location adjacent to the exterior light that is not operating properly;
(b) commanding the flight control system 125 to control the position and an orientation of the AAV 100 to engage the lightbulb changer 115 with exterior light that is not operating properly;
(c) commanding the actuator 112 to control the lightbulb changer 115 to remove the exterior light that is not operating properly from its corresponding socket;
(d) commanding the flight control system 125 to control the position and the orientation of the AAV 100 to engage a replacement lightbulb in the lightbulb changer 115' with the corresponding socket; and
(e) commanding the actuator 112 to control the lightbulb changer 115' to install the replacement lightbulb in the corresponding socket.

It should be noted that other steps, including opening and closing a canopy, removal and reinstallation of a portion of a housing, can likewise be implemented as previously discussed in conjunction with FIGS. 2H and 21.

In various embodiments, the flight control system 125 is further configured to maintain the position of the AAV 100 in a stable hover state at the location that facilitates the unobstructed view of the plurality of exterior lights of the structure, to enable the camera 104 to capture the image data corresponding to the unobstructed view of the plurality of exterior lights of the structure. The flight control system can further be configured to maintain the position and the orientation of the AAV 100 in a stable hover state to enable the AAV 100 to engage the lightbulb changer 115 with the one of the plurality of exterior lights that is not operating properly and further tp enable the AAV 100 to engage the replacement lightbulb in the lightbulb changer 115' with the empty socket.

Furthermore, the processor 132 receives, from the flight control system 125, hover control data indicating that a stable hover state of the AAV 100 cannot be maintained. For example, the flight controller 126 can attempt to control the AAV 100 to a stable hover state with a fixed orientation and position and analyze motion data from the motion sensors 112 and/or the GPS receiver 120. If the motion data indicates an amount of motion greater than a threshold indicating the maximum tolerated movement for a stable hover state, such as in conditions of high wind or wind shear, heavy rain, hail or other conditions detrimental to stable hovering, the processor 132 can abort the lightbulb replacement process. In addition or in the alternative, the processor 132 can be further configured to:
(a) receive, from the camera, image data captured during the lightbulb replacement process; and
(b) analyze the image date to determine that a stable hover state of the AAV cannot be maintained, based on for example, excessive jitter in the image data.

Aborting the lightbulb replacement process based on the analysis of motion data and/or image data can avoid damage to the structure, the replacement lightbulb, and to the AAV 100.

In addition, to assisting with the lighting inspection procedure and assisting in determining that a stable hover state of the AAV cannot be maintained, the analysis of image data for the camera 104 by the processor 132 can also be used to control various steps in the lightbulb replacement process. For example, the processor 132 can be further configured to:
(a) receive, from the camera, image data captured during the lightbulb replacement process;
(b) analyze the image data; and
(c) commanding the flight control system 125 to control the position and the orientation of the AAV 100 to engage the lightbulb changer 115 with the exterior light that is not operating properly—based on the analyzing of the image data.

For example, the exterior light that is not operating properly can be recognized via pattern recognition and located in the image data and used to home-in the lightbulb changer 115 on the light. Similarly, the processor 132 can command the flight control system 125 to control the position and the orientation of the AAV 100 to engage the replacement lightbulb in the lightbulb changer 115' with the socket—based on the analysis of the image data. For example, the empty socket can be recognized via pattern recognition and located in the image data and used to home-in the lightbulb changer 115' on the socket.

In various embodiments, the processor 132 is further configured to perform a quality assurance procedure after installation of the replacement lightbulb that includes:
(a) receiving, from the camera 104, image data captured after the replacement lightbulb is installed in the corresponding socket;
(b) analyzing the image data captured after the replacement bulb is installed in the corresponding socket to determine when the replacement lightbulb is not operating properly; and
(c) implementing a reinstallation procedure to remove and reinstall the replacement bulb, when the replacement lightbulb is not operating properly.

In this fashion, if the replacement lightbulb is not lighting up because it is not firmly seated in the socket, the AAV 100 can attempt to remove the replacement bulb and try the installation procedure again to attempt to reseat the replacement lightbulb. The quality assurance procedure can then be repeated as well. When the analysis of the image data determines that the replacement lightbulb is operating properly, the processor 132 can command the flight control system to control the position of the AAV 100 to a location corresponding to an AAV base.

Figure 4:
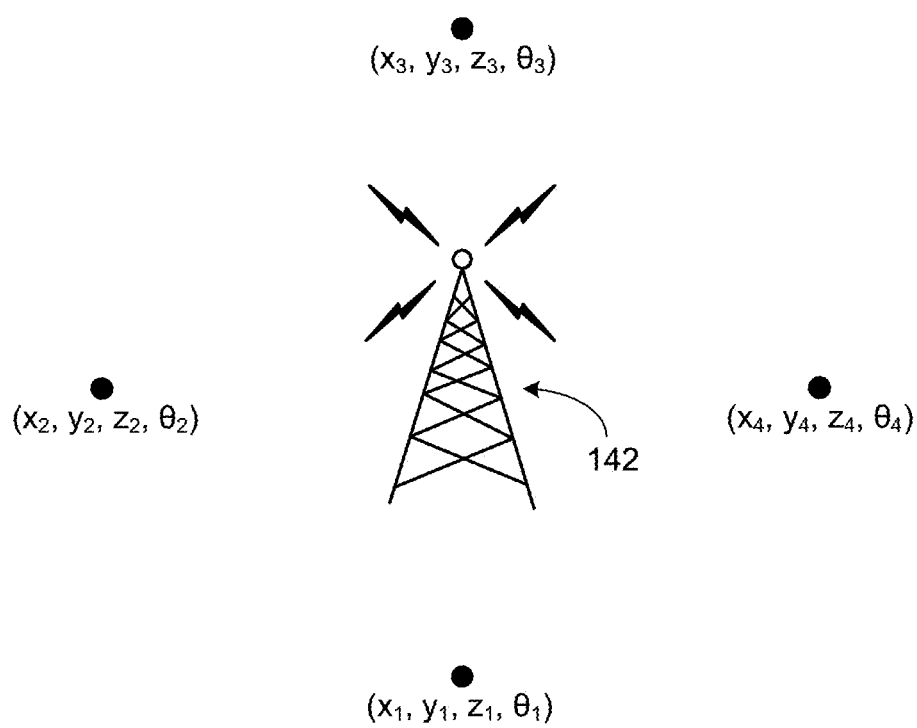
FIG. 4 is a schematic/graphical representation that illustrates locations about a structure in accordance with an embodiment of the present disclosure.

FIG. 4 is a schematic/graphical representation 135 that illustrates locations about a structure in accordance with an embodiment of the present disclosure. A radio tower 142 is shown schematically as an example of a structure having a plurality of exterior lights. In particular, blinking and/or non-blinking lights are installed over the length of the tower and on all four sides to warn aircraft at night as to the position of the tower. Four different unobstructed viewing positions $x_i$, $y_i$, $z_i$ for viewing to the tower 142, each include a viewing azimuth $\theta_i$ corresponding to a yaw axis angle, are presented in vector form where i=1, 2, 3, 4.

In the example shown:
$\theta_1$=90 degrees
$\theta_2$=0 degrees
$\theta_3$=270 degrees
$\theta_4$=180 degrees While the example shown presents four unobstructed viewing positions for a single structure, a greater of viewer number can be employed. For more complex structures, such as tall buildings with complex shapes, an unobstructed viewing location can be stored for each side having exterior lights.

Figure 5:
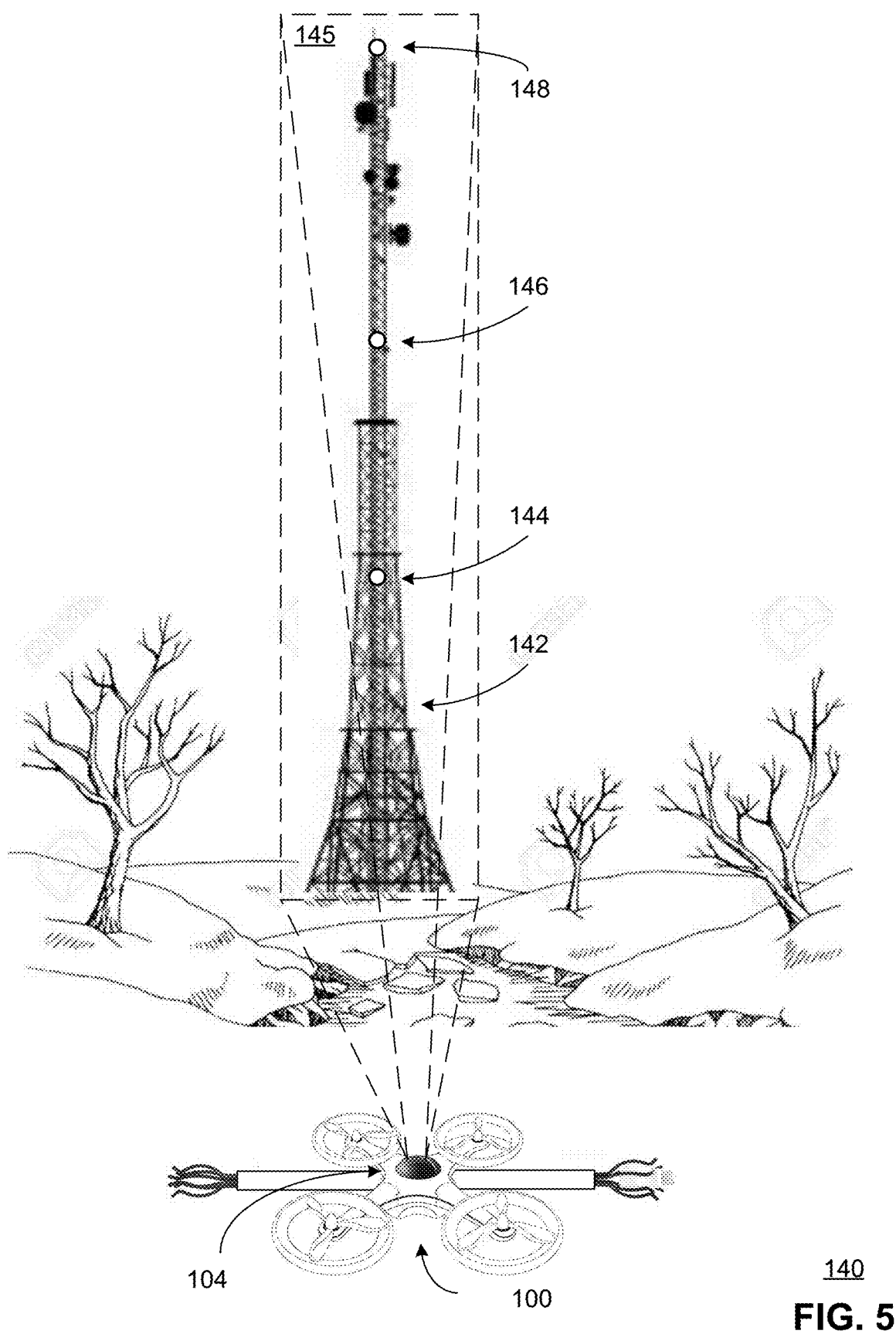
FIG. 5 is a pictorial representation that illustrates a view of a structure in accordance with an embodiment of the present disclosure.

FIG. 5 is a pictorial representation 140 that illustrates a view of a structure in accordance with an embodiment of the present disclosure. A radio tower 142 is shown pictorially as an example of a structure having a plurality of exterior lights 144, 146 and 148. In this example of operation, the position of the AAV 100 has been controlled, based on the coordinate data, to a location that facilitates an unobstructed view of the plurality of exterior lights 144, 146 and 148 of the structure 142. The camera 104 captures image data 145 that includes the plurality of exterior lights 144, 146 and 148 of the structure 142.

In various embodiments, the camera 104 has a charge coupled device (CCD) or other video or still imaging element that captures image data in a near infrared spectrum such as 880 nm or other infrared spectrum. This allows the camera to more effectively operate in twilight or night conditions when the exterior lights would be expected to be operating. Furthermore, the light emitted by incandescent, halogen, sodium vapor, mercury vapor, light emitting diode or other lights would be expected to include sufficient emissions in this spectrum to permit the processor to easily analyze an image data of this kind to determine if an exterior light is functioning properly or improperly (i.e., it is properly or sufficiently lit or not)

FIG. 6 is a graphical diagram 150 of schematic data 152 in accordance with an embodiment of the present disclosure. The schematic data 152 indicates the positions on the structure of the plurality of exterior lights as square regions 154, 156 and 158 on a central axis that represents the central axis 153 of the structure 142 of FIG. 5 along with its base 155. While a particular schematic representation of the structure 142 is reflected by schematic data 152, other schematic representations that indicate the positions on the structure of the plurality of exterior lights can likewise be employed FIG. 7 is a graphical representation 160 of schematic data 152 superimposed on image data of a structure 142 in accordance with an embodiment of the present disclosure. In the example shown, the processor 132 superimposes the schematic data 152 on the image data of the structure 142 by aligning the base 155 with the base of the structure 142 in the image and the central axis 153 with the central axis of the structure 142 in the image. In the fashion, the region 154 corresponds to the expected location of the exterior light 144, the region 156 corresponds to the expected location of the exterior light 146, and the region 158 corresponds to the expected location of the exterior light 148.

The processor 132 presented in conjunction with FIG. 3 operates to analyze the image data in the region the region 154 (based on light intensity in the region 154, for example) to determine if the exterior light 144 is operating properly or improperly (e.g. it is properly lit or not). The processor 132 also operates to analyze the image data in the region the region 156 (based on light intensity in the region 156, for example) to determine if the exterior light 146 is operating properly or improperly (e.g. it is properly lit or not) and further operates to analyze the image data, in the region the region 156 (based on light intensity in the region 158, for example) to determine if the exterior light 148 is operating properly or improperly (e.g. it is properly lit or not). If any of the exterior lights are operating improperly, the processor 132 can initiate a lightbulb replacement process as discussed in conjunction with FIG. 3, for example, to replace the lightbulb of the light that is not working.

Figure 8:
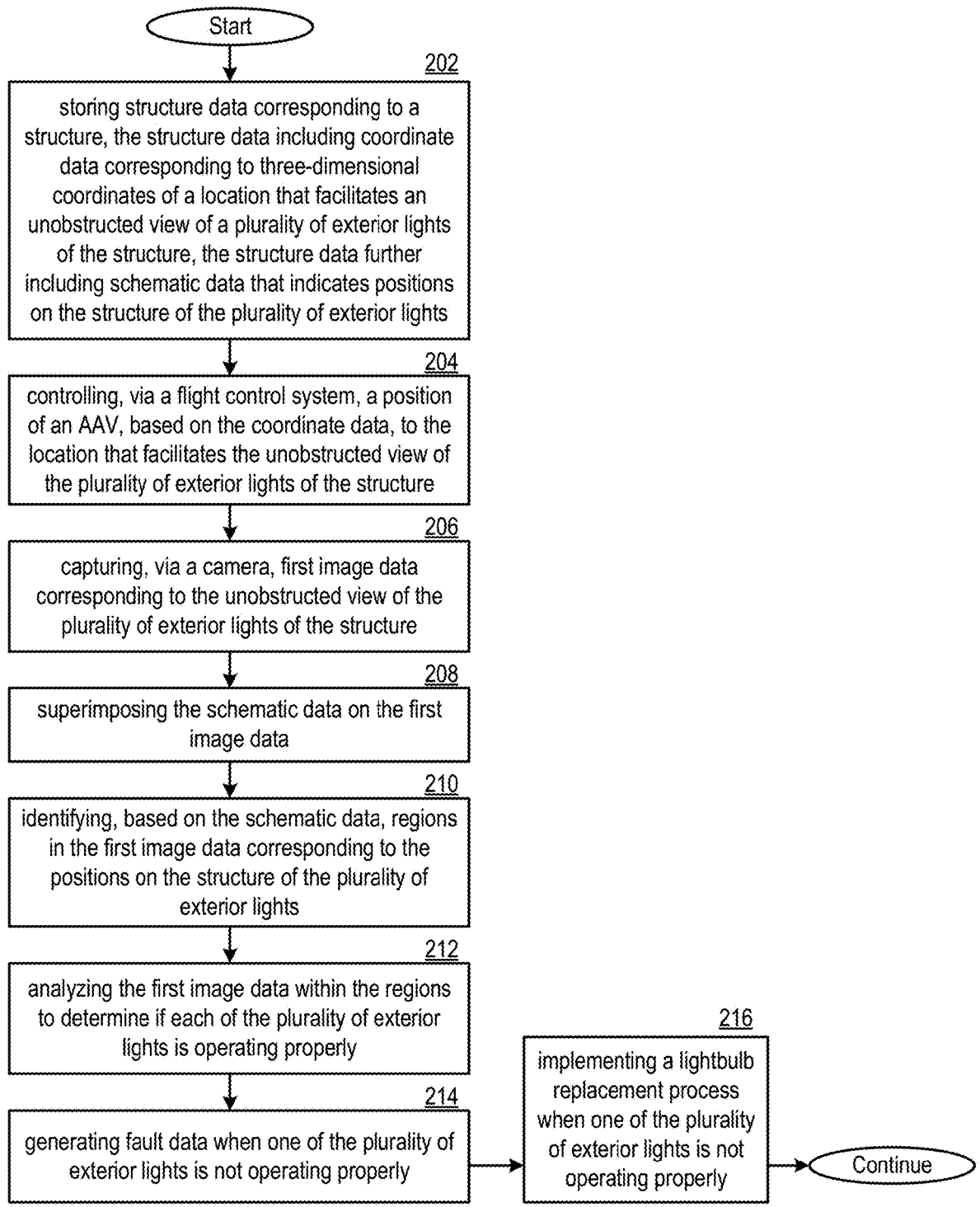
FIG. 8 is a flowchart representation of a method in accordance with an embodiment of the present disclosure.

FIG. 8 is a flowchart representation 200 of a method in accordance with an embodiment of the present disclosure. In particular a method is presented for use with one or more features or functions presented in conjunction with FIGS. 1-7. Step 202 includes storing structure data corresponding to a structure, the structure data including coordinate data corresponding to three-dimensional coordinates of a location that facilitates an unobstructed view of a plurality of exterior lights of the structure, the structure data further including schematic data that indicates positions on the structure of the plurality of exterior lights. Step 204 includes controlling, via a flight control system, a position of an AAV, based on the coordinate data, to the location that facilitates the unobstructed view of the plurality of exterior lights of the structure. Step 206 includes capturing, via a camera, first image data corresponding to the unobstructed view of the plurality of exterior lights of the structure. Step 208 includes superimposing the schematic data on the first image data. Step 210 includes identifying, based on the schematic data, regions in the first image data corresponding to the positions on the structure of the plurality of exterior lights. Step 212 includes analyzing the first image data within the regions to determine if each of the plurality of exterior lights is operating properly. Step 214 includes generating fault data when one of the plurality of exterior lights is not operating properly. Step 216 includes implementing a lightbulb replacement process when one of the plurality of exterior lights is not operating properly.

Figure 9:
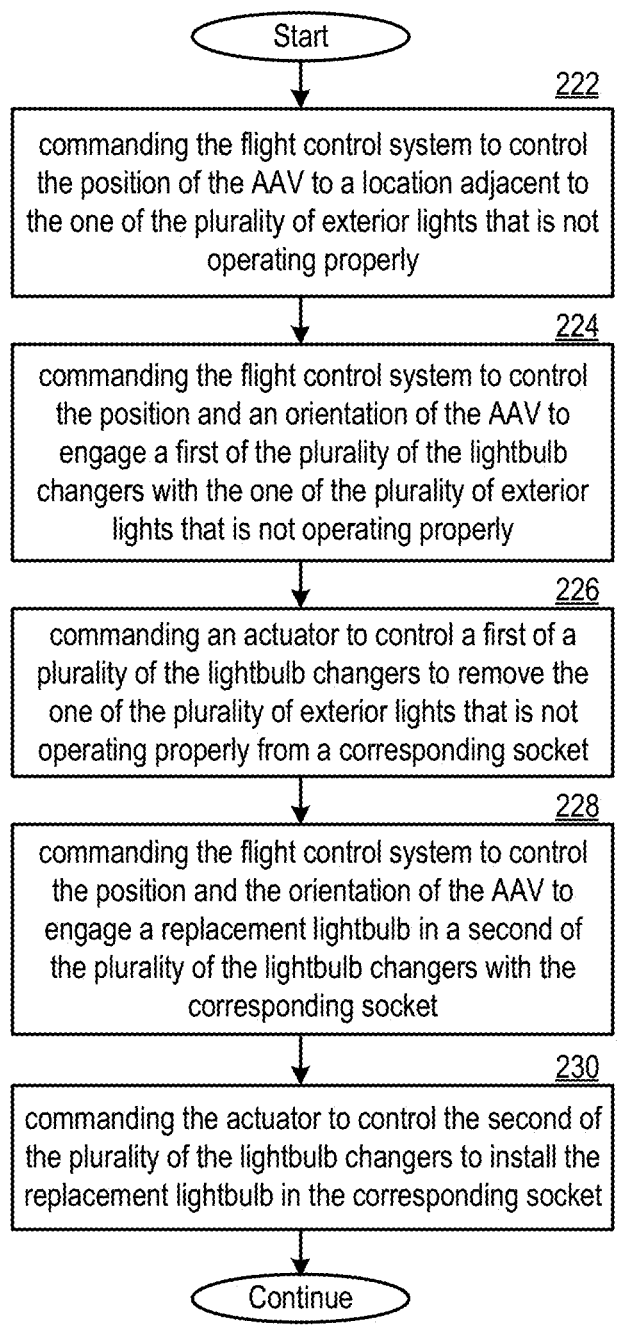
FIG. 9 is a flowchart representation of a method in accordance with an embodiment of the present disclosure.

FIG. 9 is a flowchart representation 220 of a method in accordance with an embodiment of the present disclosure. In particular a lightbulb replacement process is presented for use with one or more features or functions presented in conjunction with FIGS. 1-8. Step 222 includes commanding the flight control system to control the position of the AAV to a location adjacent to the one of the plurality of exterior lights that is not operating properly. Step 224 includes commanding the flight control system to control the position and an orientation of the AAV to engage a first of the plurality of the lightbulb changers with the one of the plurality of exterior lights that is not operating properly. Step 226 includes commanding an actuator to control a first of a plurality of the lightbulb changers to remove the one of the plurality of exterior lights that is not operating properly from a corresponding socket. Step 228 includes commanding the flight control system to control the position and the orientation of the AAV to engage a replacement lightbulb in a second of the plurality of the lightbulb changers with the corresponding socket. Step 230 includes commanding the actuator to control the second of the plurality of the lightbulb changers to install the replacement lightbulb in the corresponding socket.

In various embodiments the method further includes: receiving, from the flight control system, hover control data indicating that a stable hover state of the AAV cannot be maintained; and aborting, based on the hover control data, the lightbulb replacement process.

In various embodiments the method further includes: receiving, from the camera, second image data captured during the lightbulb replacement process; analyzing the second image date to determine that a stable hover state of the AAV cannot be maintained; and when the stable hover state of the AAV cannot be maintained, aborting the lightbulb replacement process.

In various embodiments the method further includes: receiving, from the camera, second image data captured during the lightbulb replacement process; and analyzing the second image data; wherein the commanding the flight control system to control the position and the orientation of the AAV to engage the first of the plurality of the lightbulb changers with the one of the plurality of exterior lights that is not operating properly is based on the analyzing of the second image data.

In various embodiments, step 228 is based on the analyzing of the second image data. In various embodiments the method further includes: maintaining the position of the AAV in a stable hover state at the location that facilitates the unobstructed view of the plurality of exterior lights of the structure, to enable the camera to capture the first image data corresponding to the unobstructed view of the plurality of exterior lights of the structure.

In various embodiments the method further includes: maintaining the position and the orientation of the AAV in a stable hover state to enable the AAV to engage the first of the plurality of the lightbulb changers with the one of the plurality of exterior lights that is not operating properly.

In various embodiments the method further includes: maintaining the position and the orientation of the AAV in a stable hover state to enable the AAV to engage the replacement lightbulb in the second of the plurality of the lightbulb changers with the corresponding socket.

In various embodiments the method further includes: receiving, from the camera, second image data captured after the replacement lightbulb is installed in the corresponding socket; analyzing the second image data captured after the replacement bulb is installed in the corresponding socket to determine when the replacement lightbulb is not operating properly; and implementing a reinstallation procedure to remove and reinstall the replacement bulb, when the replacement lightbulb is not operating properly.

In various embodiments the method further includes: receiving, from the camera, second image data captured after the replacement lightbulb is installed in the corresponding socket; analyzing the second image data captured after the replacement bulb is installed in the corresponding socket to determine when the replacement lightbulb is operating properly; and commanding the flight control system to control the position of the AAV to a location corresponding to an AAV base, when the replacement lightbulb is operating properly.

It is noted that terminologies as may be used herein such as data, bit stream, stream, signal sequence, etc. (or their equivalents) have been used interchangeably to describe digital information whose content corresponds to any of a number of desired types (e.g., data, video, speech, audio, etc. any of which may generally be referred to as 'data'). Furthermore, "image data" includes video or still image data captured by a video camera or still image camera.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "controller", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An autonomous aerial vehicle (AAV) comprising:
    a plurality of lightbulb changers;
    an actuator for controlling the plurality of lightbulb changers;
    a structure database configured to store structure data corresponding to a structure, the structure data including coordinate data corresponding to three-dimensional coordinates of a location that facilitates an unobstructed view of a plurality of exterior lights of the structure, the structure data further including schematic data that indicates positions on the structure of the plurality of exterior lights;
    a flight control system configured to control a position of the AAV, based on the coordinate data, to the location that facilitates the unobstructed view of the plurality of exterior lights of the structure;
    a camera configured to capture first image data corresponding to the unobstructed view of the plurality of exterior lights of the structure; and
    a processor configured to perform a lighting inspection procedure that includes:
        superimposing the schematic data on the first image data;
        identifying, based on the schematic data, regions in the first image data corresponding to the positions on the structure of the plurality of exterior lights;
        analyzing the first image data within the regions to determine if each of the plurality of exterior lights is operating properly;
        generate fault data when one of the plurality of exterior lights is not operating properly;
    wherein, when one of the plurality of exterior lights is not operating properly, the processor implements a lightbulb replacement process that includes:
        commanding the flight control system to control the position of the AAV to a location adjacent to the one of the plurality of exterior lights that is not operating properly;
        commanding the flight control system to control the position and an orientation of the AAV to engage a first of the plurality of the lightbulb changers with the one of the plurality of exterior lights that is not operating properly;
        commanding the actuator to control the first of the plurality of the lightbulb changers to remove the one of the plurality of exterior lights that is not operating properly from a corresponding socket;
        commanding the flight control system to control the position and the orientation of the AAV to engage a replacement lightbulb in a second of the plurality of the lightbulb changers with the corresponding socket; and
        commanding the actuator to control the second of the plurality of the lightbulb changers to install the replacement lightbulb in the corresponding socket.

2. The AAV of claim 1, wherein the processor is further configured to:
    receive, from the flight control system, hover control data indicating that a stable hover state of the AAV cannot be maintained; and
    aborting, based on the hover control data, the lightbulb replacement process.

3. The AAV of claim 1, wherein the processor is further configured to:

receive, from the camera, second image data captured during the lightbulb replacement process;
analyzing the second image date to determine that a stable hover state of the AAV cannot be maintained; and
when the stable hover state of the AAV cannot be maintained, aborting the lightbulb replacement process.

4. The AAV of claim 1, wherein the processor is further configured to:
receive, from the camera, second image data captured during the lightbulb replacement process; and
analyze the second image data;
wherein the commanding the flight control system to control the position and the orientation of the AAV to engage the first of the plurality of the lightbulb changers with the one of the plurality of exterior lights that is not operating properly is based on the analyzing of the second image data.

5. The AAV of claim 4, wherein the commanding the flight control system to control the position and the orientation of the AAV to engage the replacement lightbulb in the second of the plurality of the lightbulb changers with the corresponding socket is based on the analyzing of the second image data.

6. The AAV of claim 1, wherein the flight control system is further configured to maintain the position of the AAV in a stable hover state at the location that facilitates the unobstructed view of the plurality of exterior lights of the structure, to enable the camera to capture the first image data corresponding to the unobstructed view of the plurality of exterior lights of the structure.

7. The AAV of claim 1, wherein the flight control system is further configured to maintain the position and the orientation of the AAV in a stable hover state to enable the AAV to engage the first of the plurality of the lightbulb changers with the one of the plurality of exterior lights that is not operating properly.

8. The AAV of claim 1, wherein the flight control system is further configured to maintain the position and the orientation of the AAV in a hover state to enable the AAV to engage the replacement lightbulb in the second of the plurality of the lightbulb changers with the corresponding socket.

9. The AAV of claim 1, wherein the processor is further configured to:
receive, from the camera, second image data captured after the replacement lightbulb is installed in the corresponding socket;
analyze the second image data captured after the replacement bulb is installed in the corresponding socket to determine when the replacement lightbulb is not operating properly; and
implement a reinstallation procedure to remove and reinstall the replacement bulb, when the replacement lightbulb is not operating properly.

10. The AAV of claim 1, wherein the processor is further configured to:
receive, from the camera, second image data captured after the replacement lightbulb is installed in the corresponding socket;
analyze the second image data captured after the replacement bulb is installed in the corresponding socket to determine when the replacement lightbulb is operating properly; and
when the replacement lightbulb is operating properly, command the flight control system to control the position of the AAV to a location corresponding to an AAV base.

11. A method comprising:
storing structure data corresponding to a structure, the structure data including coordinate data corresponding to three-dimensional coordinates of a location that facilitates an unobstructed view of a plurality of exterior lights of the structure, the structure data further including schematic data that indicates positions on the structure of the plurality of exterior lights;
controlling, via a flight control system, a position of an AAV, based on the coordinate data, to the location that facilitates the unobstructed view of the plurality of exterior lights of the structure;
capturing, via a camera, first image data corresponding to the unobstructed view of the plurality of exterior lights of the structure;
superimposing the schematic data on the first image data;
identifying, based on the schematic data, regions in the first image data corresponding to the positions on the structure of the plurality of exterior lights;
analyzing the first image data within the regions to determine if each of the plurality of exterior lights is operating properly;
generating fault data when one of the plurality of exterior lights is not operating properly;
when one of the plurality of exterior lights is not operating properly, implementing a lightbulb replacement process that includes:
commanding the flight control system to control the position of the AAV to a location adjacent to the one of the plurality of exterior lights that is not operating properly;
commanding the flight control system to control the position and an orientation of the AAV to engage a first of the plurality of the lightbulb changers with the one of the plurality of exterior lights that is not operating properly;
commanding an actuator to control a first of a plurality of the lightbulb changers to remove the one of the plurality of exterior lights that is not operating properly from a corresponding socket;
commanding the flight control system to control the position and the orientation of the AAV to engage a replacement lightbulb in a second of the plurality of the lightbulb changers with the corresponding socket; and
commanding the actuator to control the second of the plurality of the lightbulb changers to install the replacement lightbulb in the corresponding socket.

12. The method of claim 11, further comprising:
receiving, from the flight control system, hover control data indicating that a stable hover state of the AAV cannot be maintained; and
aborting, based on the hover control data, the lightbulb replacement process.

13. The method of claim 11, further comprising:
receiving, from the camera, second image data captured during the lightbulb replacement process;
analyzing the second image date to determine that a stable hover state of the AAV cannot be maintained; and
when the stable hover state of the AAV cannot be maintained, aborting the lightbulb replacement process.

14. The method of claim 11, further comprising:
receiving, from the camera, second image data captured during the lightbulb replacement process; and
analyzing the second image data;
wherein the commanding the flight control system to control the position and the orientation of the AAV to engage the first of the plurality of the lightbulb changers with the one of the plurality of exterior lights that is not operating properly is based on the analyzing of the second image data.

15. The method of claim 14, wherein commanding the flight control system to control the position and the orientation of the AAV to engage the replacement lightbulb in the second of the plurality of the lightbulb changers with the corresponding socket is based on the analyzing of the second image data.

16. The method of claim 11, further comprising:
maintaining the position of the AAV in a stable hover state at the location that facilitates the unobstructed view of the plurality of exterior lights of the structure, to enable the camera to capture the first image data corresponding to the unobstructed view of the plurality of exterior lights of the structure.

17. The method of claim 11, further comprising:
maintaining the position and the orientation of the AAV in a stable hover state to enable the AAV to engage the first of the plurality of the lightbulb changers with the one of the plurality of exterior lights that is not operating properly.

18. The method of claim 11, further comprising:
maintaining the position and the orientation of the AAV in a stable hover state to enable the AAV to engage the replacement lightbulb in the second of the plurality of the lightbulb changers with the corresponding socket.

19. The method of claim 11, further comprising:
receiving, from the camera, second image data captured after the replacement lightbulb is installed in the corresponding socket;
analyzing the second image data captured after the replacement bulb is installed in the corresponding socket to determine when the replacement lightbulb is not operating properly; and
implementing a reinstallation procedure to remove and reinstall the replacement bulb, when the replacement lightbulb is not operating properly.

20. The method of claim 11, further comprising:
receiving, from the camera, second image data captured after the replacement lightbulb is installed in the corresponding socket;
analyzing the second image data captured after the replacement bulb is installed in the corresponding socket to determine when the replacement lightbulb is operating properly; and
commanding the flight control system to control the position of the AAV to a location corresponding to an AAV base, when the replacement lightbulb is operating properly.

* * * * *